May 21, 1963  J. G. SCHNEEMAN  3,090,865
FLUOROSCOPIC INSPECTION APPARATUS
Filed Nov. 2, 1959  3 Sheets-Sheet 1
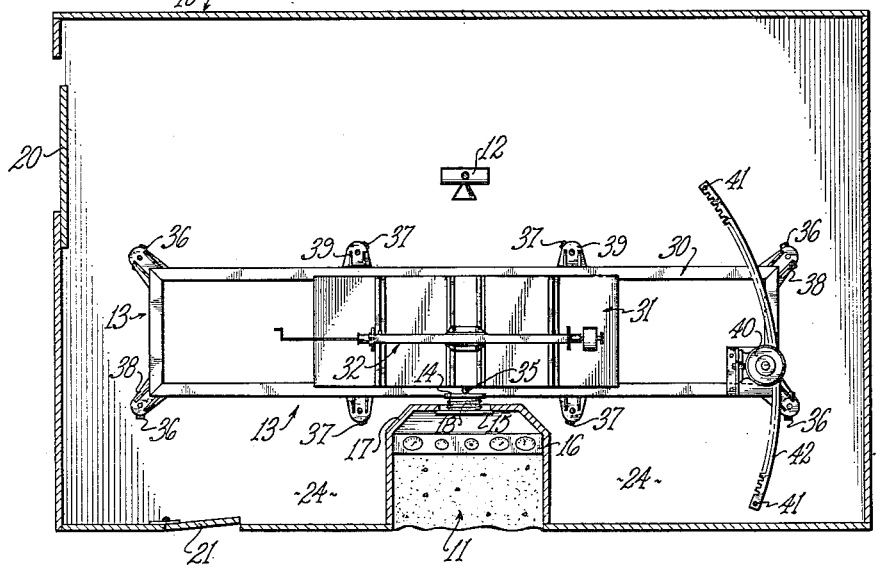
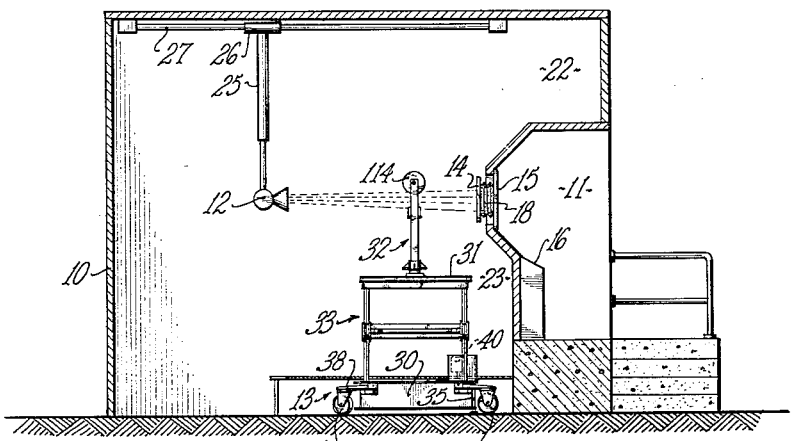
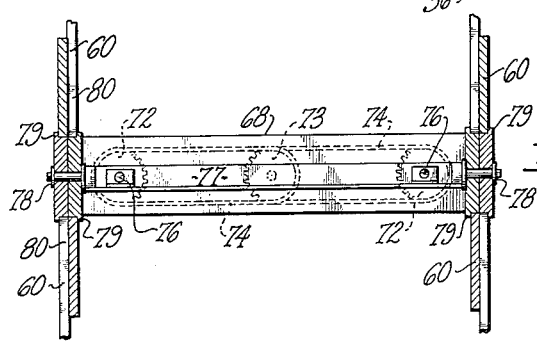
INVENTOR.
JUSTIN G. SCHNEEMAN
BY Fulwider Mattingly & Huntley
ATTORNEYS May 21, 1963
J. G. SCHNEEMAN
3,090,865
FLUOROSCOPIC INSPECTION APPARATUS
Filed Nov. 2, 1959
3 Sheets-Sheet 2
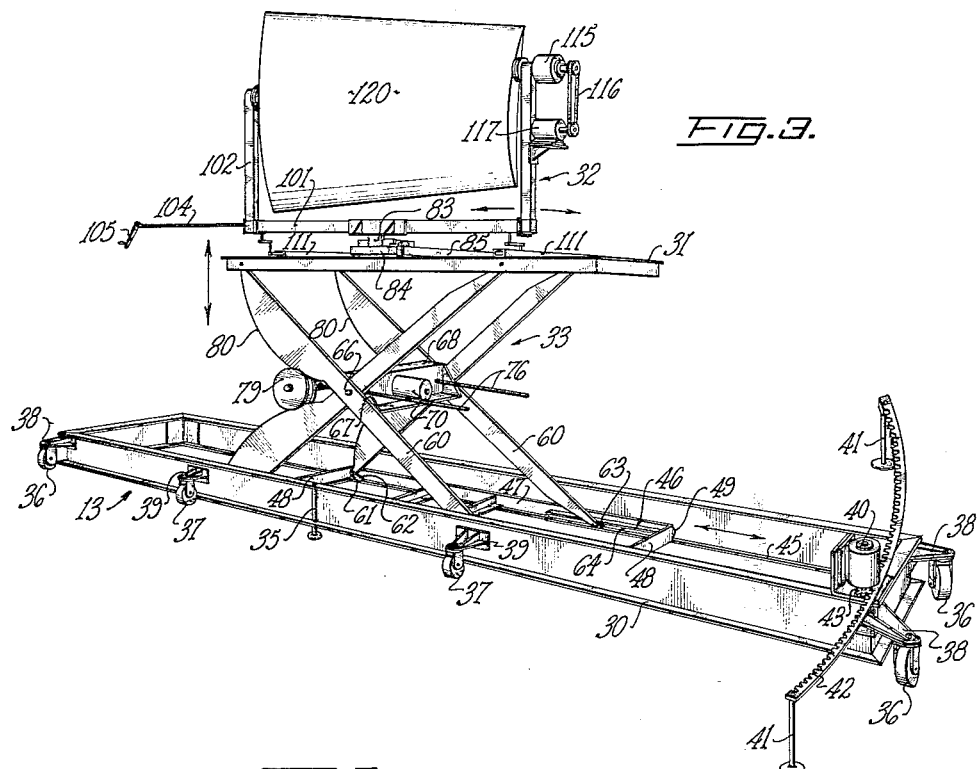
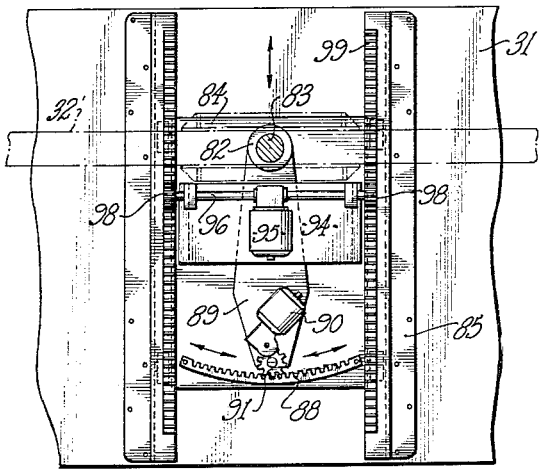
INVENTOR.
JUSTIN G. SCHNEEMAN
BY Zulwider, Mattingly & Huntley
ATTORNEYS May 21, 1963 J. G. SCHNEEMAN 3,090,865
FLUOROSCOPIC INSPECTION APPARATUS
Filed Nov. 2, 1959 3 Sheets-Sheet 3
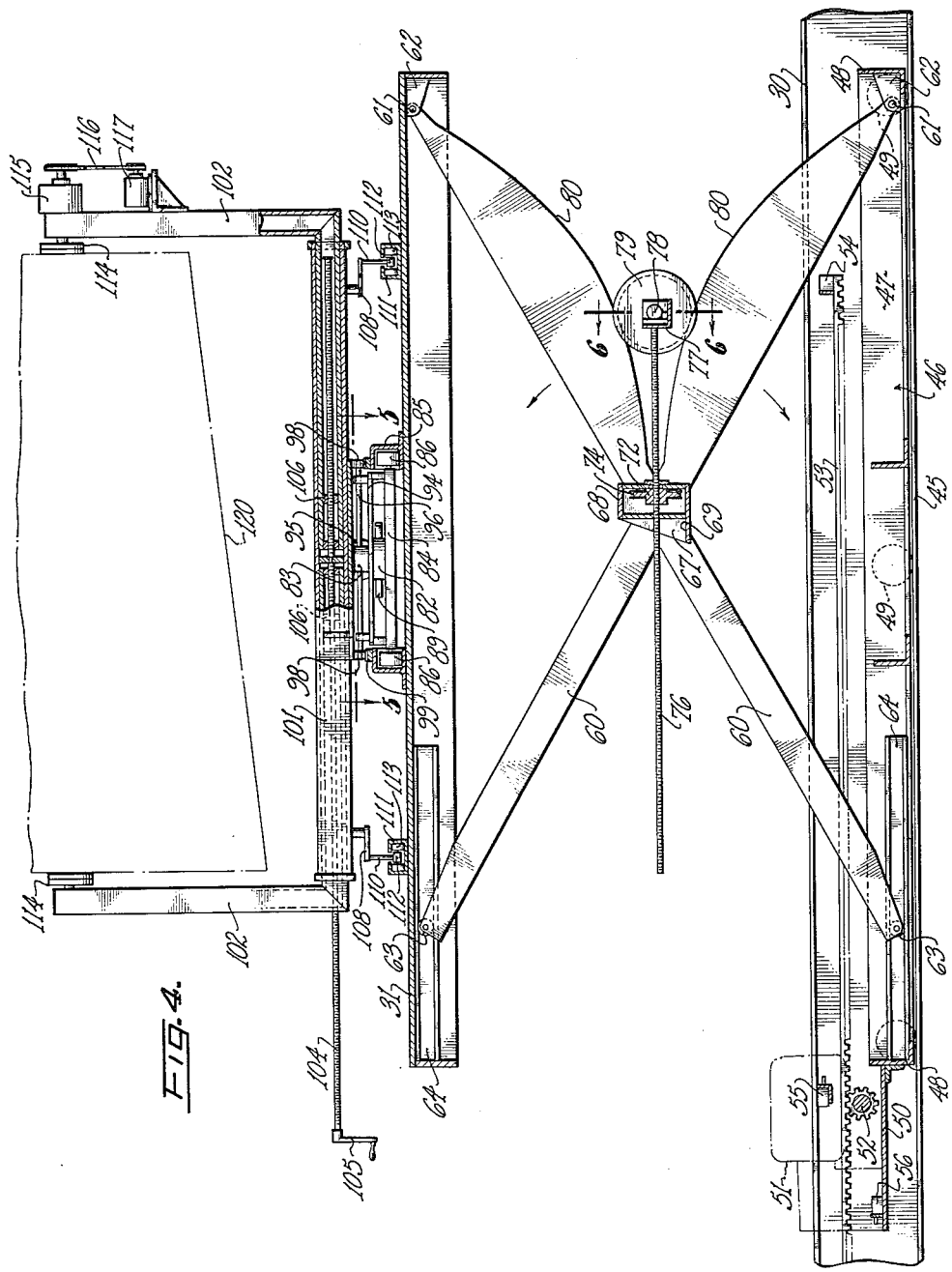
INVENTOR.
JUSTIN G. SCHNEEMAN
BY
ATTORNEYS

United States Patent Office 3,090,865
Patented May 21, 1963

3,090,865
FLUOROSCOPIC INSPECTION APPARATUS
Justin G. Schneeman, 4726 Radford Ave.,
North Hollywood, Calif.
Filed Nov. 2, 1959, Ser. No. 850,412
15 Claims. (Cl. 250—52)

This invention relates generally to fluoroscopic inspection apparatus and more particularly to apparatus for holding and remotely positioning a specimen into an oriented position for fluoroscopic and radiographic examination.

Improved manufacturing techniques now permit fabrication of large, lightweight, high strength assemblies with a low safety factor. For example, very large honeycomb panels are now frequently used in aircraft. But this advance in manufacturing technique has created a serious problem in the nondestructive inspection of such assemblies, which may be extremely large and may have internal structures or over-all configurations presenting problems in the manipulation of the assembly.

More specifically, by way of example, a honeycomb panel may be flat or curved and may have compound curves or angles. It may consist simply of two skins of metal bonded to honeycomb cells but more frequently will have built-in fittings, braces, inserts, brackets and close-outs brazed therein. In order to establish the structural adequacy of the concealed parts of the assembly by X-ray inspection, it is necessary to manipulate the particular part or area into a desired orientation relative to the X-ray beam. For example, the shape of a honeycomb cell is best viewed when the cell is disposed coaxially with the beam. The amount of and discontinuities in the brazing material holding the opposite ends of the cell to the skins can best be seen when the cell is angularly related to the X-ray beam. Accordingly, in order to completely inspect a panel, each unit area thereof must be oriented with respect to the beam in both of these positions, that is, both coaxially and angularly. Particularly with respect to curved panels, the difficulties of manipulation are compounded when it is further considered that means must be provided for varying the desired spacing between the radiation source and the image-reproducing means so as to achieve the desired resolution or definition of the image.

In general, the present invention contemplates a room of sufficient magnitude to accommodate the largest specimen to be inspected and lined with a material that is impermeable to a source of radiation positioned within the room. One wall of the room is formed with an inwardly offset operator's booth having a viewing window and screen projecting further inwardly in alignment with the source of radiation. A specimen-holding fixture is mounted within the room in the area between the radiation source and operator's booth and holds the specimen being inspected immediately in front of the screen at any desired angle relative to the beam of radiation. The fixture is adapted for practically universal movement of the specimen mounted therein and is remotely controllable by the operator from the operator's booth. The radiation source and viewing window remain stationary while the specimen is moved to intercept the beam in various attitudes but the spacing between the radiation source and image-producing screen is remotely adjustable by the operator so as to vary the resolution and brightness of the image, as desired.

With the foregoing in mind, it is an object of my invention to provide a fluoroscopic inspection apparatus for very large specimens or assemblies and including a fixture that is remotely controllable by an operator to position a selected portion of the specimen into a desired attitude relative to the beam of radiation.

It is also an object of the invention to provide an apparatus of this type in which a specimen can be remotely positioned into a desired attitude angularly related to the beam of radiations and all portions of it thereafter scanned in the desired attitude.

A further object of the invention is to provide an apparatus of this type with a fixture by means of which specimens having compound curves or angles can be inspected and in which any unit area of the specimen can be oriented in a desired position relative to the beam of radiation.

Yet another object of my invention is to provide fluoroscopic inspection apparatus for very large specimens in which any unit area of a flat or irregularly formed specimen can be positioned in close proximity to an image-reproducing means, or spaced away from the image-reproducing means, as desired, whereby the operator may achieve a desired degree of magnification of the image.

These and other objects and advantages of my invention will be apparent from the following description of a presently preferred embodiment thereof when taken in conjunction with the annexed drawings in which:

FIGURE 1 is a plan view of a radiation-proof enclosure embodying my invention, the roof of the enclosure being removed to disclose the interior parts;

FIGURE 2 is a vertical sectional view taken substantially along the axis of the beam of radiation between the source thereof and the viewing window;

FIGURE 3 is a perspective view of the specimen-holding fixture in FIGURE 1;

FIGURE 4 is a partial, side elevational view of the specimen-holding fixture with portions thereof being broken away to show the interior details of construction;

FIGURE 5 is a sectional view taken along the line 5—5 of FIGURE 4; and

FIGURE 6 is a sectional view taken along the line 6—6 of FIGURE 4.

Referring now to the drawings for the general arrangement of my inspection apparatus, and in particular referring to FIGURES 1 and 2, there is shown a lead-lined room 10 that in one wall is formed with an inwardly offset observation booth 11. Within the room 10 and immediately opposite the booth 11 is a source of radiation 12, and a specimen-holding fixture 13 is disposed between the source and observation booth. A fluoroscopic screen 14 is disposed within the room on the inner wall of the observation booth 11, over a leaded observation window 15. A control panel 16 in the booth 11 has suitable devices for manipulating and energizing the radiation source 12 and also for selectively manipulating a specimen on the fixture 13.

In the illustrated embodiment of the invention, the source of radiation consists of an X-ray generator, but it will be appreciated that other sources of radiation may be employed. Similarly, although the image-producing means illustrated consists of a fluorescent screen, other image-producing means may be substituted for the screen or can be used in conjunction therewith, as for example, an electronic image intensifier or a closed circuit television camera and receiver.

More specifically, the room 10 in one end wall is provided with a sliding door 20 which is large enough to admit specimens which may have an area of hundreds of square feet. A hinged access door 21 is provided in the front wall of the room 10 having an observation booth 11 by means of which personnel may enter and leave the room for purposes other than loading the specimen upon the fixture 13. It will be understood that both of these doors are adapted to completely protect operating personnel against radiation when closed. In addition, the doors 20 and 21 are equipped with interlock switches which will render the excitation of the X-ray equipment impossible when either or both of these doors are opened. When the X-ray equipment is in operation both of these doors are locked so as to prevent entry of unauthorized personnel, but the access door 21 is provided with a locking means permitting opening thereof from the inside without the use of the key. As a further precaution room 10 is provided with an observation light (not shown) which can be turned on so that the interior of the room may be viewed through observation windows in the doors 20 and 21 or through the observation window 15, before the equipment is energized.

Generally, fluoroscopic inspection procedure calls for a dense X-ray beam on the screen 14, so that during inspection the source 12 should be positioned quite close to the screen with the specimen therebetween. Source 12 is thus mounted for movement towards and away from the screen 14, the range of movement being sufficient not only for the purpose of achieving the desired source-to-screen inspection distance but also to move the source sufficiently far away from the screen to permit the mounting of specimens in the fixture 13. Accordingly, the source 12 is supported at the same elevation as the screen 14, by a member 25 depending from a carrier 26 that in turn is movably mounted on a pair of tracks 27 affixed to the ceiling of the room 10. The control panel 16 includes a control for a means whereby the operator can remotely cause travel of the source 12 in a horizontal direction towards and away from the screen 14.

The parts positioner or fixture 13 comprises a main frame 30, a platform 31, and a yoke 32. The arms of the yoke 32 are adapted to support a specimen to be examined for rotation through 360° about a horizontal axis and the yoke itself is reciprocably rotatable about a vertical axis within a predetermined arc. The yoke 32 is also supported on the platform 31 for bodily movement laterally of the platform. A collapsible framework 33 supports the platform 31 for vertical adjustment thereof and the framework and platform, in turn, are movable as a unit longitudinally of the main frame 30.

Referring to FIGURE 1, it will be noted that the observation booth 11 is quite narrow in its horizontal dimension longitudinally of the room 10. A portion 17 of the booth 11, which supports the screen 14 and viewing window 15, is still narrower than the booth and projects farther inwardly into the room 10 than the booth. The screen 14 is supported on an internally reinforced bellows mechanism 18 connected to the supporting structure for the window 15 and adapted to be remotely adjusted in a horizontal direction towards and away from a specimen in the yoke 32. The screen 14 thus projects still farther inwardly into the room 10 and in a vertical plane confronting the specimen presents a small area about which the specimen is, in effect, swivelly fulcrumed.

With this arrangement, even very large specimens can be freely inclined or angulated towards the booth 11, about both vertical and horizontal axes, without coming into contact with the booth or any other portion of the room 10. For example, assume a large panel curved about a longitudinally extending axis, perhaps even semi-cylindrical. Such a piece can be presented convexly or concavely oriented towards the screen 14. If rotated about a horizontal axis, its periphery has clearance in a space 22 above the booth 11 or a space 23 beneath the projecting portion 17 of the booth (see FIGURE 2). If rotated about a vertical axis, its periphery has clearance in the spaces 24 on opposite sides of the booth 11. In all of these attitudes, the unit area of the specimen being inspected is spaced closely adjacent to the screen 14 for proper viewing.

The main frame 30 is of elongate rectangular configuration and has a length substantially twice the length of the platform 31 whereby a specimen can be scanned from one end to the other, by moving the platform 31 from one end to the other of the main frame 30. The frame 30 is pivotally anchored to the floor of the room 10 as indicated at 35, this pivot being disposed midway between opposite ends of the main frame and along one side of the frame. The pivot 35 is preferably located in alignment with the source 12 and the fluorescent screen 14, and preferably immediately beneath the screen.

To support the main frame 30 for pivotal movement it is provided with a wheel 36 at each corner thereof and a group of four wheels 37 arranged in pairs on opposite sides of the frame. The corner wheels 36 are held to the frame by brackets 38 adapted to hold the wheels in positions tangent to their radius from the pivot 35, and the wheels 37 are similarly held on the frame by brackets 39 also adapted to hold the wheels 37 in positions tangent to their radius from the pivot 35. In FIGURE 1, the main frame 30 is shown in a neutral position in which it extends perpendicularly relative to the beam cast by the source 12, but the frame can be angularly adjusted about the pivot 35 to approximately 15 degrees in either direction from this neutral position.

In order to angulate the main frame 30, there is mounted on one end thereof an electrical motor 40 operatively associated with a toggle switch or the like located in the control panel 16. Adjacent the same end of the main frame 30, a pair of posts 41 are rigidly affixed in upstanding position to the floor of the room 10 and at their upper ends support therebetween an arcuate gear rack 42. This rack has a curvature corresponding to its radial distance from the pivot 35. The rack teeth are formed on the inwardly facing edge of the rack 42 and the motor 40 is drivingly engaged therewith through a gear means 43. When the main frame angulation toggle switch in the control panel 16 is moved in a first direction a corresponding end of the main frame 30 is caused to move outwardly from the front wall of the room 10. Conversely, when the toggle switch is actuated in the opposite direction, correspondingly opposite movement of the main frame 30 occurs whereby the other end of the main frame is caused to move outwardly from the front wall of the room 10.

The opposite side members of the main frame 30 along their lower edges are provided with inwardly extending flanges 45 which provide tracks to support the collapsible framework 33 for movement longitudinally of the main frame. The collapsible framework 33 includes a rectangular base frame 46 consisting of a pair of opposite side members 47 and a pair of opposite end members 48. Each of the opposite side members mounts a plurality of rollers 49 supported on the main frame flanges 45 to permit rolling movement of the platform 31 and collapsible framework 33 throughout substantially the entire length of the frame 30.

At one end the base frame 46 has a motor mounting plate 50 extending horizontally therebeyond on which a drive motor 51 is mounted. This drive motor is adapted for reversibly turning a pinion 52 that is engaged by the downwardly facing teeth of an elongated rack 53, affixed to and extending longitudinally of the main frame 30. The rack 53 extends from one end of the main frame 30 to approximately the mid-point of the main frame and at the mid-point of the main frame on its upper surface mounts a stop 54. A limit switch 55 is carried by the motor 51 in alignment with the stop 54 and upon engagement with the stop causes de-energization of the motor. An automatic stop to arrest movement of the collapsible framework 33 in the other direction is provided by another limit switch 56 affixed to the mounting plate 50 and adapted for engagement with another stop member secured to the confronting end of the main frame 30. For raising and lowering a specimen on the platform 31, both sides of the platform are supported on a pair of crossed beams 60, arranged in scissors-linkage relationship and also connected to the base frame 46. Each of the beams 60 is pivotally fastened at one end, as at 61, to a bracket 62, each bracket being fastened to an underside corner of the platform 31 or within one corner of the base frame 47. At their opposite ends, each of the beams 60 mounts a roller 63. The platform 31 and base frame 47 at the ends thereof opposite to the brackets 62, interiorly mount guide channels 64 which extend along respective side members of the platform and base frame and in which the rollers 63 are confined for movement longitudinally of the platform 31 and base frame 47.

Each pair of beams 60 is pivotally interconnected on a trunnion 66 that is mounted on a triangularly shaped end member 67, two end members 67 defining opposite ends of a motor support 68 that extends between the two pairs of beams 60. Referring to FIGURE 4, it will be seen that the motor support 68 is of box beam cross sectional configuration and has an outwardly extending bottom flange 69 on which a drive motor 70 is mounted (see FIGURE 3).

As is shown in FIGURE 4, the support 68 is hollow and near its opposite ends journals a pair of sprockets 72. These sprockets are respectively in alignment with a pair of co-axial drive sprockets 73 on the output shaft of the motor 70 and a pair of endless chains 74 drivingly connect the drive sprockets and sprockets 72 (see FIGURE 6).

The sprockets 72 are coaxially threadedly engaged with a pair of elongated screw shafts 76. At one end both of the screw shafts are journaled in an L-shaped crossbeam 77, whose opposite ends mount a pair of stub shafts 78 for two pairs of flanged discs 79. One disc of each pair rides along a convexly curved edge 80 of one of the associated pairs of beams 60, while the other disc 79 of the pair rides along the convexly curved edge 80 of the other of the associated pair of beams 60.

The drive motor 70 is reversible in order to move the screw shafts 76 in either direction. Since the load supported on the platform 31 may be quite heavy, this motor is preferably of the constant speed type adapted for relatively slow rotation. In order to have the rate of vertical movement of the platform 31 directly proportional to the constant speed of the motor screw shafts 76, I have provided the convex edges 80 on the beams 60.

The yoke 32 is supported on the platform 31, both for bodily movement transversely of the platform, as well as for limited angular movement about a vertical axis. The latter movement is for the purpose of orienting a portion of the specimen being examined into a desired angular relationship relative to the beam of radiation. The former movement is for moving the specimen away from the viewing window and screen 14 in order to provide room for rotating the specimen within the yoke about a horizontal axis through 360° without danger of the specimen bumping against any portion of the observation booth 11, and may also be used for magnification of the image cast on the screen 14.

In order to accomplish both of these movements, the yoke 32 is affixed on top of a hub 82 that, in turn, is journaled on a shaft 83 mounted on a carriage 84. A pair of channel-shaped tracks 85 are affixed on top of the platform 31 and the carriage 84 on its opposite sides is provided with a plurality of rollers 86 receivable in the tracks 85.

For angulating the yoke 32, the carriage 84 at one end mounts an arcuate rack 88. A motor mounting arm 89 is affixed to the lower end of the hub 82 and extends toward the rack 88. A motor 90 is mounted on the arm 89 and through gear means 91 is drivingly engageable with the rack 88. This motor is reversible and accordingly, in response to energization of the motor for rotation in the appropriate direction, the yoke 32 can be moved through an angle corresponding to the arc subtended by the rack 88.

For moving the yoke 32 transversely of the platform 31, the carriage 84 mounts a plate 94 superposed above the arm 89. On this plate is a motor 95 having driving engagement with a shaft 96 that extends between the two tracks 85. The outer ends of the shaft 96 mount pinions 98 that are engaged with a pair of racks 99, each of these racks being attached on top of and extending along one of the tracks 85. The motor 95 is reversible whereby the shaft 96 can be rotated in either direction to move the carriage 84 in a corresponding direction.

The yoke 32 comprises a center section 101 and a pair of arms 102. The center section and arms are of box-beam cross sectional configuration and the arms 102 are L-shaped, having one leg thereof telescopically slidable within opposite ends of the center section 101.

In order to vary the spacing between the arms 102 for receiving specimens of different lengths within the yoke, an adjustment crank 104 is coaxially supported within the center section 102 in the corresponding legs in the pair of arms 102. This crank has an operating handle 105 and is threadedly engaged with a pair of bolts 106 each affixed in a horizontal leg of one of the yoke arms 102. The portion of the crank shaft 104 within one of the yoke arms is formed with right-hand threads, while the portion of the crank shaft disposed within the other yoke arm is formed with left-hand threads. In the center of the yoke 32 the crank shaft 104 is journaled in a bearing 107 held internally by the center section 101 to hold the shaft against axial movement. Accordingly, upon rotation of the crank shaft in a given direction, the yoke arms 102 are drawn together, or expanded, dependent upon the direction of rotation of the crank handle 105.

A stabilizer means is provided at opposite ends of the yoke 32 to prevent any unsteadiness in the specimen supported in the yoke, particularly during manipulation of the specimen. Each of these stabilizers takes the form of a horizontal link 108 pivotally connected at one end to a bearing 109 affixed to the underside of the center section 101 and pivotally connected at its other end to another bearing 110. A pair of transversely extending channels 111 are mounted on top of the platform 31 near the opposite ends thereof, and each of these channels is provided with a longitudinal extending upwardly opening slot. Within each of the channels 111 is a bar 112 rollingly supported in the channel by a plurality of rollers 113. Each bar 112 supports an upstanding shaft extending through the channel slot and mounting the bearing 110. Within the channel slot, each of these shafts also mounts a roller 113 having contact with one edge of the channel slot.

To support a specimen for rotation on a horizontal axis each of the yoke arms 102 at its upper end rotatably mounts a disc 114. One of these discs is an idler, while the other is coaxially drivably engaged by the output shaft of a reduction gear means 115, which in turn is drivably engaged by an endless chain 116 interconnected to the output shaft of a motor 117 mounted on the other yoke arm 102. The two discs 114 are adapted to support a bracket means in which the specimen to be examined is clamped.

In FIGURES 3 and 4, the platform 31 is shown in partially elevated position. However, it will be understood that for loading a specimen in the yoke 32, the platform 31 is placed in lowermost position by suitable actuation of the elevator motor 70. When fully lowered, the platform 31 is spaced above the bed frame 46 a distance slightly less than the diameter of the discs 79, the platform 31 then being at a convenient height above the floor surface of the room 11 for loading the specimen into the yoke 32.

The specimen is first placed in a suitable bracket means. In the drawings the specimen comprises a honeycomb panel 120 which is transversely curved. A pair of mounting plates 121 are affixed to opposite ends of the specimen panel 120, preferably along the neutral axis of the panel. After the yoke arms 102 have been spaced apart an appropriate distance, the mounting plates 121 are fastened to the pair of discs 114.

After the panel 120 has been loaded into the yoke 32, the elevator motor 70 is actuated in a direction to lift a corner portion thereof into horizontal alignment with the screen 14, if necessary. A specimen such as the panel 120 can conveniently be inspected by starting in one corner thereof, and then causing the specimen to be passed horizontally to intercept the beam of radiation between the source 12 and screen 14 until the other end of the specimen is reached. The specimen is then lifted or lowered, as the case may be, to present a new horizontal stratum of the specimen for returning movement past the viewing screen 14. The specimen is thus shifted horizontally back and forth at varying levels thereof past the screen 14 until all areas thereof have been examined.

In the case of the curved panel 120 it is desirable to inspect each unit area thereof with the honeycomb cells both coaxially aligned and angularly related relative to the beam of radiation. For the former purpose, each horizontal stratum of the panel can be properly oriented with respect to the beam by proper rotation of the yoke discs 114. Assuming the yoke 32 and the panel 120 held therein to be in alignment with the platform 31, the platform is then caused to travel along the main frame 30 whereby all of the cells in the horizontal stratum of the panel on the same level with the intercepted beam will be presented coaxially to the beam. After one horizontal stratum of cells has been thus examined, the vertical adjustment of the platform 31 is changed and the panel 120 further adjusted about the horizontal axis of the discs 114 whereby all of the cells in another horizontal stratum of the panel will be presented coaxially with the beam of radiation.

When it is desired to scan the cells of the honeycomb panel 120 in a desired angular orientation, a very similar procedure to that described above is followed. The yoke 32 and the panel therein are first adjusted to a desired angular relationship or the panel to the beam of radiation so that the honeycomb cells are similarly presented angularly rather than coaxially to the beam. This is shown by way of example in FIGURE 1, wherein it will be observed that the yoke 32 is angularly related rather than being aligned with the platform 31. When the yoke has been thus angularly adjusted, the platform 31 is caused to move longitudinally along the main frame 30 and concurrently with the longitudinal of the platform, the yoke 32 is caused to move bodily transversely of the platform 31 by means of actuation of the motor 95. The particular unit area of the honeycomb panel under observation can thus be maintained in the proper spatial relationship relative to the fluorescent screen 14 and radiation source 12 so that all areas thereof may be viewed in substantially the same resolution, and brightness.

It will be observed that the specimen held in the yoke 32 can be rotated about a horizontal axis throughout 360°. Thus either the concave or convex curvature of the panel 20 can be positioned most adjacent the screen 14. It will also be observed that since both the yoke 32 and the main frame 30 are pivoted about vertical axes that either or both may be employed for presenting the honeycomb cells in the desired angular orientation relative to the beam of radiation. For example, assuming the parts to be in the position shown in FIGURE 1, the yoke 32 can be moved to a position in alignment with the main frame 30, and the main frame thereafter angularly positioned relative to the beam. This procedure has the advantage over the procedure first mentioned that it avoids the necessity for shifting the yoke laterally relative to the platform 31 as the platform is shifted longitudinally of the main frame. For panels or other specimens having compound curvatures or angles, both the main frame angulation and yoke angulation controls may be employed to great advantage.

As has been indicated, all of these several movement controlling devices are remotely controllable by conventional means from the controllable panel 16. Although limit switches have been shown only in connection with the longitudinal movement of the platform 31 on the main frame 30, it will be understood that similar arrangements are employed for automatically limiting actuation of the motors controlling other movements of the apparatus.

While a presently preferred embodiment of my invention has been illustrated and described herein, it is to be understood that I do not mean to be limited to the specific details of construction disclosed except as defined in the appended claims.

I claim:

1. In a fluoroscopic inspection apparatus, the combination comprising:
   a source of radiation for directing a beam of radiation horizontally;
   a fluoroscopic image-producing means horizontally spaced apart from said source and in alignment with said beam;
   an elongated frame positioned between said aligned source and image-producing means and supported on a surface for pivotal movement about a vertical axis to vary the angle at which said frame intersects a vertical plane including said source and image-producing means, the vertical axis of said frame being disposed in substantially vertical alignment beneath said image-producing means and eccentrically with respect to said frame;
   and a specimen support on said frame that is movable along said frame to intercept said beam between said source and said image-producing means, the angle of interception of a specimen with said beam being changeable by moving said frame pivotally about said vertical axis.

2. In a fluoroscopic inspection apparatus, the combination comprising: a source of radiation for directing a beam of radiation; a fluoroscope image-producing means spaced apart from said source and in alignment with said beam; an elongated main frame positioned between said source and image-producing means to be angularly related to said beam and supported for pivotal movement about a stationary axis for adjustment of said frame to a desired angle relative to said beam, the pivotal connection of said frame being along one longitudinal side of said frame in substantially a common plane with said image-producing means; and a specimen support on said frame that is reciprocable longitudinally of said frame, said support when moved longitudinally of said frame causing a specimen to intercept said beam at an angle determined by the angular adjustment of said frame relative to said beam.

3. In a fluoroscopic inspection apparatus, the combination comprising: an enclosure that is impermeable to penetration by radiation from a source disposed therein; a source of radiation within said enclosure for directing a beam of radiation horizontally; a fluoroscopic image-producing means mounted in a wall of said enclosure in horizontally spaced apart relationship to said source in alignment with said beam, said means being offset inwardly of said enclosure to project inwardly beyond the portions of said wall supporting and surrounding said means; an elongated main frame supported on a floor surface of said enclosure for pivotal movement about a vertical axis to be angularly adjustable relative to said beam and to the plane of said image producing means, the pivotal connection of said frame and floor surface being along one side of said frame in substantially vertical alignment with said image-producing means; and a specimen support on said frame that is reciprocable longitudinally of said frame to cause a specimen to intercept said beam at an angle determined by the degree of rotation of said frame relative to said floor surface.

4. In a fluoroscopic inspection apparatus, the combination comprising: an enclosure that is impermeable to penetration by radiation from a source disposed therewithin; a source of radiation within said enclosure for directing a beam of radiation horizontally; a fluoroscopic image-producing means mounted on a wall of said enclosure in horizontally spaced apart relationship to said source in alignment with said beam, said means being offset inwardly of said enclosure to project inwardly beyond the portions of said wall supporting and surrounding said means; an elongated main frame positioned between said source and image-producing means and supported on a floor surface of said enclosure for pivotal movement about a vertical axis, the pivotal connection of said frame and floor surface being along one side of said frame in substantially vertical alignment with said image-producing means whereby said frame is angularly adjustable relative to said beam and to said image producing means; a platform mounted on said frame for reciprocal movement longitudinally of said frame and past said image-producing means, said platform being vertically adjustable to a desired elevation above said frame; and a yoke mounted on said platform for rotation about a vertical axis and to support a specimen for rotation about a horizontal axis, said yoke also being bodily movable laterally of said platform.

5. An apparatus as set forth in claim 4 in which said source is mounted for movement in a horizontal direction towards and away from said image-producing means.

6. In a fluoroscopic inspection apparatus, the combination comprising: an enclosure that is impermeable to penetration by radiation from a source disposed therein; a source of radiation within said enclosure for directing a beam of radiation horizontally; a fluoroscopic image-producing means mounted on a wall of said enclosure in horizontally spaced apart relationship to said source in alignment with said beam, said means being offset inwardly of said enclosure to project inwardly beyond the portions of said wall supporting and surrounding said means; an elongated main frame positioned between said source and image-producing means and supported on a floor surface of said enclosure for pivotal movement about a vertical axis, the pivotal connection of said frame and floor surface being along one side of said frame in substantially vertical alignment with said image-producing means; a drive means operatively associated with an end of said frame for selectively bi-directionally shifting said frame about said vertical axis within predetermined limits; a base frame supported on said main frame for movement therealong; a drive means operatively associated with said base frame and main frame for selectively moving said base frame reciprocally along said main frame; a platform carried by a collapsible framework on said base frame for co-movement with said base frame along said main frame, said framework being collapsible and expandable in its vertical dimension for varying the elevation of said platform above said main frame; a power means on said framework for selectively collapsing and expanding said framework; a carriage mounted on said platform for reciprocation laterally of said platform; a yoke mounted on said platform for rotation about a vertical axis; a drive means for selectively bi-directionally angulating said yoke about the vertical axis thereof; means on a pair of upstanding arms of said yoke for supporting a specimen therebetween for rotation on a horizontal axis; and a power means for selectively rotating a specimen in either direction about said horizontal axis.

7. In a fluoroscopic inspection apparatus, the combination comprising: an elongated substantially rectangular and horizontally disposed main frame having a means for pivotal anchoring thereof to a floor surface about a vertical axis positioned on one side of said frame substantially midway between the ends of said frame; a horizontally disposed platform supported on said frame for movement longitudinally thereof and for vertical adjustment relative to said frame; a carriage mounted on said platform for reciprocal movement laterally of said platform; a substantially U-shaped yoke having a pair of arms extending upwardly from opposite ends of a horizontally extending center section, said yoke being pivotally mounted on said carriage for rotation about a vertical axis; and means at the upper ends of said yoke arms to support a specimen therebetween for rotation on a horizontal axis.

8. An apparatus as set forth in claim 7 in which said main frame is supported on a floor surface by a plurality of wheels and said main frame has a drive motor mounted on an end thereof, said floor surface stationarily supporting a rigid member extending laterally of and adjacent to said end of said main frame and drivingly interconnected to said motor for causing angulation of said main frame in response to energization of said drive motor.

9. An apparatus as set forth in claim 7 in which said platform is supported on each side thereof by a pair of crossed beams pivotally interconnected at their midpoints in scissors-linkage relationship, both pairs of said beams being supported on a base frame that is longitudinally movably mounted in said main frame, each of said beams being pivotally connected at one end to a corner of said base frame or platform and having rolling engagement at its other end with said platform or base frame, and in which said base frame mounts a drive motor having a shaft drivingly engageable with a portion of said main frame to move said base frame, beams and platform longitudinally of said main frame.

10. An apparatus as set forth in claim 9 in which said pivotal interconnections of said pairs of beams are on opposite ends of a support extending therebetween and on which an elevator motor is mounted, said support mounting a horizontal pair of parallel shafts, each of said shafts being disposed alongside a pair of said beams and substantially bisecting an angle included between said beams, each of said shafts at one end mounting a pair of rotatable discs, each of which discs has rolling contact with an edge of one of said beams, said elevator motor being drivingly connected with both said shafts for co-movement of said shafts to expand and contract said beams.

11. An apparatus as set forth in claim 10 in which said beams have convex edges extending substantially one-half the length thereof that are engaged by said discs for causing vertical motion of said platform at a rate directly proportional to the rate of horizontal movement of said shafts.

12. An apparatus as set forth in claim 7 in which said platform has a pair of channels extending transversely thereof and equally spaced on opposite sides of the midline of said platform and by which said carriage is guided in traversing said platform, said carriage mounting a drive motor having driving connections with said channels to move said platform and yoke laterally of said platform.

13. An apparatus as set forth in claim 7 in which said carriage has a vertical shaft on which a hub of said yoke is journaled and an arm is affixed to said hub to extend radially outwardly therefrom, said carriage mounting a rigid member confronting the free end of said arm and the free end of said arm mounting a motor having a driving engagement with said rigid member to angulate said yoke in response to energization of said motor.

14. An apparatus as set forth in claim 7 in which said platform has a pair of channels extending transversely thereof at opposite ends of said yoke, each of said channels guiding a bar for movement laterally of said platform and each having an upwardly opening longitudinally extending slot to pass a bearing member carried on said bar, and a pair of stabilizers pivotally connected to opposite ends of said center section of said yoke, said stabilizers including a horizontal link pivotally connected at one end to an end of said center section of yoke and pivotally connected at its other end to said bearing member of said bar.

15. An apparatus as set forth in claim 7 in which a means is provided in said yoke to vary the spacing between said yoke arms.

(References on following page)

References Cited in the file of this patent

UNITED STATES PATENTS

| | | | |
|---|---|---|---|
| 1,233,122 | Pohl | July 10, | 1917 |
| 2,145,686 | Dessauer | Jan. 31, | 1939 |
| 2,360,326 | Adrian et al. | Oct. 17, | 1944 |
| 2,598,825 | Orellana | June 3, | 1952 |
| 2,677,517 | Castello | May 4, | 1954 |
| 2,870,336 | Fountain | Jan. 20, | 1959 |
| 2,885,557 | Kizaur | May 5, | 1959 |
| 2,894,140 | Schneeman | July 7, | 1959 |
| 2,950,394 | Stava et al. | Aug. 23, | 1960 |
| 2,951,162 | Stein | Aug. 30, | 1960 |

FOREIGN PATENTS

| | | | |
|---|---|---|---|
| 887,879 | Germany | Aug. 27, | 1953 |